UNITED STATES PATENT OFFICE.

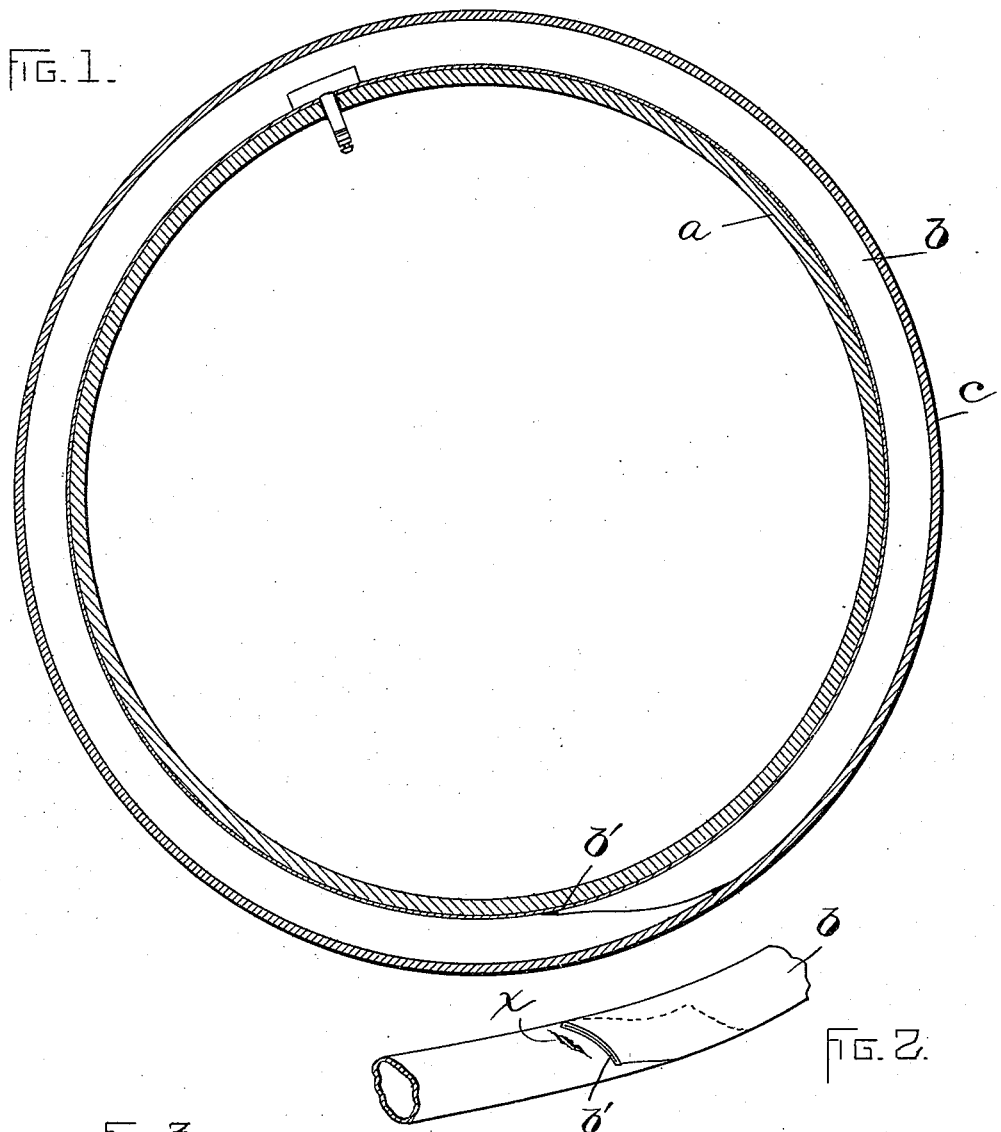

HERBERT N. WAYNE, OF NEWTON, MASSACHUSETTS.

PNEUMATIC TUBE FOR BICYCLES.

SPECIFICATION forming part of Letters Patent No. 551,018, dated December 10, 1895.

Application filed August 13, 1894. Serial No. 520,162. (No model.)

*To all whom it may concern:*

Be it known that I, HERBERT N. WAYNE, of Newton, in the county of Middlesex and State of Massachusetts, have invented certain new and useful Improvements in Pneumatic Tubes for Bicycles, of which the following is a specification.

This invention relates to rubber tubes such as used in pneumatic tires of wheels for bicycles and other vehicles to contain a charge of compressed air; and the object of the invention is to provide a new way of making such tubes which will obviate the trouble heretofore experienced from their bursting at the closed ends, where the greatest strain is felt in practice.

The accompanying drawings illustrate a construction embodying the invention and form part of this specification.

Of said drawings, Figure 1 shows a sectional view of a pneumatic tire as ordinarily constructed. Fig. 2 is a detached view of a portion of the inner tube, illustrating where the break usually occurs. Fig. 3 shows a sectional view, on an enlarged scale, of a portion of a tube constructed in accordance with my invention.

In the drawings the letter $a$ designates the supporting-rim of the wheel, $b$ the rubber tube which holds the charge of compressed air, and $c$ the rubber covering for said tube. These parts are shown in Fig. 1 assembled as ordinarily in a pneumatic tire.

It is customary to employ an inner tube of rubber which has a uniform thickness throughout, and the ends of the length of tubing may be closed, as shown at $b'$, by cementing or vulcanizing and lapped over onto each other, or their ends $b^2$ may be integral with the tube and be "butted" together.

In the use of the tire the inner tube is subjected to sudden strain in encountering irregularities in the surface traveled, and such strains are felt more at the closed ends than elsewhere, because of the limited space that may exist between these ends and the place of compression of the tire. Hence it is that the tube is more likely to give way at this part than any other, and it is a common occurrence for the tube to break, as illustrated at $x$ in Fig. 2. To overcome this difficulty, I manufacture the tube with its end portions thickened, and in Fig. 3 the letter $d$ designates the thickened rubber at one end of the tube. This form of tube will be found proof against breakage in the manner so common heretofore.

The ends of the tube are thickened by placing a short piece of rubber tubing of the desired thickness and length upon a mandrel, then slipping the end of the main tubing over said short piece and vulcanizing the two parts together.

What I claim as my invention is as follows:

As an article of manufacture a pneumatic tire comprising in its construction a rubber tube, having its ends over-lapped, the material comprising the ends of said tube being thickened for a considerable distance from said ends to prevent the bursting of said tube in the vicinity of the over-lapped ends, substantially as and for the purpose set forth.

In testimony whereof I have signed my name to this specification, in the presence of two subscribing witnesses, this 10th day of August, A. D. 1894.

HERBERT N. WAYNE.

Witnesses:
HORACE BROWN,
ARTHUR H. ABELL.